(12) United States Patent
Chen et al.

(10) Patent No.: US 11,275,764 B2
(45) Date of Patent: Mar. 15, 2022

(54) HIGHLY RESILIENT SYNCHRONOUS REPLICATION WITH AUTOMATIC RECOVERY

(71) Applicant: EMC IP Holding Company LLC, Hopkinton, MA (US)

(72) Inventors: Xiangping Chen, Sherborn, MA (US); Svetlana Kronrod, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 716 days.

(21) Appl. No.: 16/157,528

(22) Filed: Oct. 11, 2018

(65) Prior Publication Data
US 2020/0117750 A1 Apr. 16, 2020

(51) Int. Cl.
*G06F 16/27* (2019.01)
*G06F 11/14* (2006.01)
*G06F 11/16* (2006.01)

(52) U.S. Cl.
CPC ........ *G06F 16/275* (2019.01); *G06F 11/1469* (2013.01); *G06F 11/16* (2013.01); *G06F 2201/84* (2013.01)

(58) Field of Classification Search
CPC .... G06F 16/275; G06F 11/1469; G06F 11/16; G06F 2201/84
See application file for complete search history.

(56) References Cited

U.S. PATENT DOCUMENTS

| | | | | |
|---|---|---|---|---|
| 6,804,689 | B1 * | 10/2004 | Havrda | G06F 11/1464 707/661 |
| 7,359,920 | B1 * | 4/2008 | Rybicki | G06F 16/275 707/617 |
| 7,475,124 | B2 | 1/2009 | Jiang et al. | |
| 8,327,103 | B1 | 12/2012 | Can et al. | |
| 8,380,928 | B1 | 2/2013 | Chen et al. | |
| 8,429,346 | B1 | 4/2013 | Chen et al. | |
| 8,515,911 | B1 | 8/2013 | Zhou et al. | |
| 8,539,148 | B1 | 9/2013 | Chen et al. | |

(Continued)

OTHER PUBLICATIONS

U.S. Appl. No. 16/048,767, filed Jul. 30, 2018, Chen et al.
(Continued)

*Primary Examiner* — Joseph R Kudirka
*Assistant Examiner* — Matthew N Putaraksa
(74) *Attorney, Agent, or Firm* — Daly, Crowley, Mofford & Durkee, LLP (57) ABSTRACT

In one aspect, automatic recovery of a synchronous replication session in response to an error is provided for a storage system that includes a source and target sites. During an active sync replication session in which a state machine indicates the system is operating in sync, an aspect includes monitoring input/output (IO) operations. Upon determining an occurrence of the error in which data has been persisted at the source site but not at the target site, an aspect includes discontinuing replication to the target site and transitioning the state machine from a sync state to a tripped state. Upon determining, during the tripped state, resources exist to conduct sync replication remote data transfer operations, transition the state machine to an async_to_sync state. The async_to_sync state causes the storage system to initiate a recovery operation to return the source and target sites to the sync state.

20 Claims, 7 Drawing Sheets

(56) References Cited

U.S. PATENT DOCUMENTS

| | | | |
|---|---|---|---|
| 8,566,483 B1 | 10/2013 | Chen et al. | |
| 8,583,607 B1 | 11/2013 | Chen et al. | |
| 8,683,153 B1 | 3/2014 | Long et al. | |
| 8,712,976 B1 | 4/2014 | Chen et al. | |
| 8,775,388 B1 | 7/2014 | Chen et al. | |
| 8,782,324 B1 | 7/2014 | Chen et al. | |
| 8,799,601 B1 | 8/2014 | Chen et al. | |
| 8,856,202 B2* | 10/2014 | McCabe | G06F 3/0689 709/200 |
| 8,909,887 B1 | 12/2014 | Armangau et al. | |
| 8,930,746 B1 | 1/2015 | Chen et al. | |
| 8,954,699 B1 | 2/2015 | Chen et al. | |
| 8,977,812 B1 | 3/2015 | Chen et al. | |
| 9,152,336 B1 | 10/2015 | Chen et al. | |
| 9,304,889 B1 | 4/2016 | Chen et al. | |
| 9,355,112 B1 | 5/2016 | Armangau et al. | |
| 9,384,206 B1 | 7/2016 | Bono et al. | |
| 9,395,937 B1 | 7/2016 | Si et al. | |
| 9,449,011 B1 | 9/2016 | Chen et al. | |
| 9,459,809 B1 | 10/2016 | Chen et al. | |
| 9,460,102 B1 | 10/2016 | Bono et al. | |
| 9,477,431 B1 | 10/2016 | Chen et al. | |
| 9,513,814 B1 | 12/2016 | Can et al. | |
| 9,529,545 B1 | 12/2016 | Bono et al. | |
| 9,542,125 B1 | 1/2017 | Chen | |
| 9,594,514 B1 | 3/2017 | Bono et al. | |
| 9,684,593 B1 | 6/2017 | Chen et al. | |
| 9,710,187 B1 | 7/2017 | Si et al. | |
| 9,811,288 B1 | 11/2017 | Chen et al. | |
| 9,817,766 B1 | 11/2017 | Si et al. | |
| 10,019,323 B1* | 7/2018 | Bai | G06F 16/184 |
| 10,037,369 B1 | 7/2018 | Bono et al. | |
| 10,082,959 B1 | 9/2018 | Chen et al. | |
| 10,095,428 B1 | 10/2018 | Meiri et al. | |
| 10,152,381 B1 | 12/2018 | Shvaiger et al. | |
| 10,176,046 B1 | 1/2019 | Hu et al. | |
| 10,235,066 B1 | 3/2019 | Chen et al. | |
| 2002/0059279 A1* | 5/2002 | Kim | G06F 11/2074 |
| 2003/0187860 A1* | 10/2003 | Holland | G06F 16/1774 |
| 2008/0005367 A1* | 1/2008 | Barry | H04L 41/082 710/8 |
| 2010/0049718 A1* | 2/2010 | Aronovich | G06F 12/0815 707/607 |
| 2011/0154134 A1* | 6/2011 | Kohada | G06F 11/1443 714/54 |
| 2012/0166390 A1* | 6/2012 | Merriman | G06F 16/2365 707/613 |
| 2013/0019129 A1* | 1/2013 | Lawin | H04L 7/042 714/704 |
| 2014/0101479 A1* | 4/2014 | Galbraith | G06F 11/1076 714/6.2 |
| 2015/0242481 A1* | 8/2015 | Hasegawa | G06F 16/162 707/623 |
| 2017/0052710 A1* | 2/2017 | Brown | G06F 11/2079 |
| 2017/0364274 A1* | 12/2017 | Hammons | G06F 11/1451 |
| 2018/0075059 A1* | 3/2018 | Chen | G06F 16/275 |
| 2018/0095783 A1* | 4/2018 | Lillibridge | G06F 9/4881 |
| 2019/0146884 A1* | 5/2019 | Gangadharappa | G06F 3/065 711/162 |
| 2019/0163373 A1* | 5/2019 | Compton | G06F 3/0619 |
| 2019/0356609 A1* | 11/2019 | Grunwald | G06F 3/0653 |
| 2020/0073771 A1* | 3/2020 | Ward | G06F 11/2076 |
| 2020/0097370 A1* | 3/2020 | Srinivasan | G06F 11/1469 |
| 2020/0341861 A1* | 10/2020 | Ling | G06F 11/3034 |
| 2021/0034281 A1* | 2/2021 | Chabbi | G06F 12/1072 |
| 2021/0157684 A1* | 5/2021 | Marathe | G06F 11/1461 |

OTHER PUBLICATIONS

U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 15/076,775, filed Mar. 22, 2016, Chen et al.
U.S. Appl. No. 15/085,188, filed Mar. 30, 2016, Meiri et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 15/885,027, filed Jan. 31, 2018, Chen et al.
U.S. Appl. No. 16/042,363, filed Jul. 23, 2018, Chen et al.
U.S. Appl. No. 16/038,543, filed Jul. 18, 2018, Chen et al.

* cited by examiner

HIGHLY RESILIENT SYNCHRONOUS REPLICATION WITH AUTOMATIC RECOVERY

BACKGROUND

Synchronous (sync) replication is a business continuity process that mirrors data updates between two systems to prevent data loss and downtime. When sync replication is turned on for a production storage object, the system mirrors the data to a target system as part of handling write requests from an initiator, and only responds to the initiator after the writes have been persisted on both the source and target systems.

In the event of a source site disaster or data loss, a replication failover process may be implemented. During replication failover, the source and target sites are out of sync, as the source site may possess some data that hasn't yet been written to the target site, and the new the target site may possess some data that are written after the application starts to write. This out-of-sync situation presents a challenge to resume and recover sync replication after the original source system is recovered. Unlike asynchronous (async) replication, sync replication does not maintain a list of synchronized snap sets to perform incremental recovery and re-sync after failover. Without a good solution, a user may need to perform a full re-sync, which is time consuming as well as bandwidth consuming.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method to provide automatic recovery of a synchronous (sync) replication session in response to an error condition for a storage system including a source site and a target site. The method includes, during an active synchronous replication session between the source site and the target site in which a state machine at the storage system indicates the system is operating in a sync state, monitoring input/output (IO) operations. The sync state indicates the source site and the target site are operating in sync. Upon determining an occurrence of the error condition in which data subject for updating at the target site has been persisted at the source site and not yet persisted at the target site, the method includes transitioning the state machine from the sync state to a tripped state. Upon determining, during the tripped state, resources exist to conduct sync replication remote data transfer operations, transition the state machine to an async_to_sync state. The async_to_sync state causes the storage system to initiate a recovery operation. The recovery operation is configured to return the source site and the target site to a synchronous state.

Another aspect may provide a system to provide automatic recovery of a sync replication session in response to an error condition at a storage system that includes a source site and a target site. The system includes a memory having computer-executable instructions. The system also includes a processor operated by a storage system. The processor executes the computer-executable instructions. When executed by the processor, the computer-executable instructions cause the processor to perform operations. The operations include, during an active synchronous replication session between the source site and the target site in which a state machine at the storage system indicates the system is operating in a sync state, monitoring input/output (IO) operations. The sync state indicates the source site and the target site are operating in sync. Upon determining an occurrence of the error condition in which data subject for updating at the target site has been persisted at the source site and not yet persisted at the target site, the operations include transitioning the state machine from the sync state to a tripped state. Upon determining, during the tripped state, resources exist to conduct synchronous replication remote data transfer operations, transition the state machine to an async_to_sync state. The async_to_sync state causes the storage system to initiate a recovery operation. The recovery operation is configured to return the source site and the target site to a synchronous state.

Another aspect may provide a computer program product embodied on a non-transitory computer readable medium. The computer program product includes instructions that, when executed by a computer at a storage system, causes the computer to perform operations. The operations include during an active synchronous replication session between a source site and a target site of a storage system in which a state machine at the storage system indicates the system is operating in a sync state, monitoring input/output (IO) operations. The sync state indicates the source site and the target site are operating in sync. Upon determining an occurrence of the error condition in which data subject for updating at the target site has been persisted at the source site and not yet persisted at the target site, the operations include transitioning the state machine from the sync state to a tripped state. Upon determining, during the tripped state, resources exist to conduct synchronous replication remote data transfer operations, transition the state machine to an async_to_sync state. The async_to_sync state causes the storage system to initiate a recovery operation. The recovery operation is configured to return the source site and the target site to a synchronous state.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Embodiments described herein provide automatic recovery of a synchronous (sync) replication session in response to an error condition. To provide predictable high performance to applications, storage arrays, such as XtremIO, set a hard IO timeout value (for example 30 seconds based on default SCSI IO timeout on many host systems). All IOs return to the host, designated as either "success," "busy," (retry), or "error" (check condition), within the hard timeout value. This can present significant challenges for sync replication operations, as additional time is needed for each IO to copy the data from the IO request, to send the data copy to the target cluster, and to recover if there is a link or system component failure at either of the source or target sites.

When enabling sync replication, certain latency increases are expected and are typically handled by capacity planning. However, the probability of IO errors may continue to increase due to additional transfer hops and various components involved. In some cases, it is desirable to abort sync replication while allowing the host IO to complete. In other cases, such as failure during journal recovery, it may be necessary to abort/stop sync replication to allow for a complete recovery, otherwise the system may be exposed to a rolling panic of software.

The embodiments described herein allow the system to preserve data consistency in the event of sync replication IO failures, and to recover automatically without manual intervention. This capability can greatly improve the feature resilience and alleviates administrator's burden in managing sync replication.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "I/O request" or simply "I/O" or "IO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable re representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having I/O interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Figure 1:
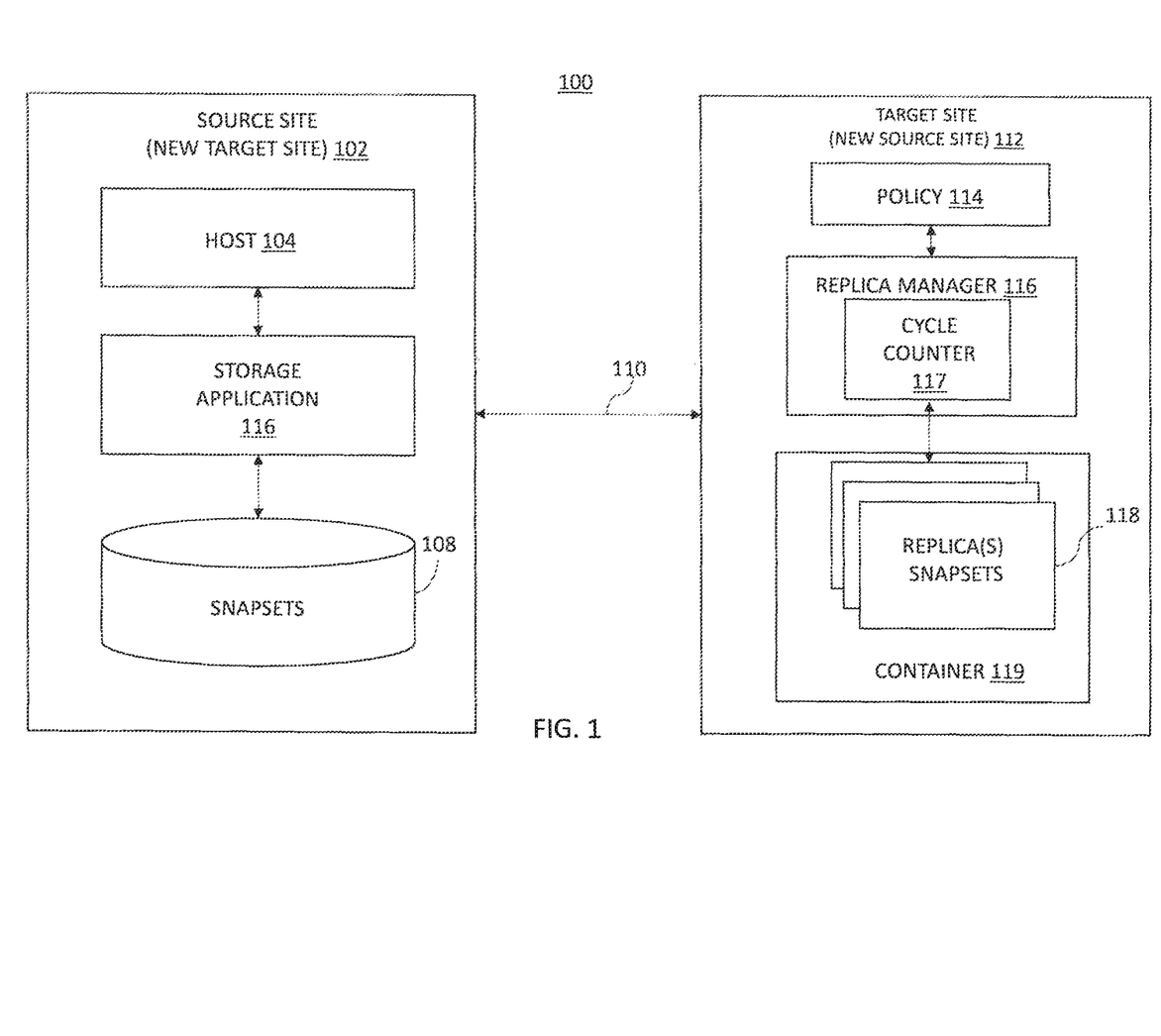
FIG. 1 is a block diagram of a storage system to perform automatic recovery of a synchronous (sync) replication session in response to an error condition in accordance with an illustrative embodiment.

Turning now to FIG. 1, an example storage system 100 for performing automatic recovery of a synchronous (sync) replication session in response to an error condition will now be described. Storage system 100 may include at least one source site 102 and at least one target site 112. In an embodiment, target site 112 is either co-located with source site 102 or is in close geographic proximity (e.g., within the same building or building complex) with the source site 102. In other embodiments, target site 112 is remotely located from the source site 102. For example, target site 112 may be geographically dispersed across cities, states, or even countries with respect to source site 102.

Source site 102 may include a host 104, storage application 106, and data storage 108. In some embodiments, storage 108 may include one or more storage volumes (e.g., V1), that operate as active, or production, volumes.

Host 104 may perform I/O operations on storage 108 (e.g., read data from and write data to storage 108). In some embodiments, the I/O operations may be intercepted by and controlled by the storage application 106. As changes are made to data stored on storage 108 via the I/O operations from host 104, or over time as storage system 100 operates, storage application 106 may perform data replication from the source site 102 to the target site 112 over a communication network 110. In some embodiments, the communication network 110 may include internal (e.g., short distance) communication links (not shown) to transfer data between storage volumes for storing replicas 118 (also referred to herein as snap sets), such as an InfiniBand (IB) link or Fibre Channel (FC) link. In other embodiments, the communication link 110 may be a long-distance communication network of a storage area network (SAN), e.g., over an Ethernet or Internet (e.g., TCP/IP) link that may employ, for example, the iSCSI protocol.

In illustrative embodiments, storage system 100 may employ a snap set (or replication) mechanism to replicate data between source site 102 and target site 112. A snap set (or replica) may be created from data within storage 108 and transferred to the target site 112 during a data replication cycle by data replication.

Data replication may be performed based on data replication policies that may define various settings for data recovery operations, shown as policy 114 in target site 112. For example, policy 114 may define a plurality of attributes, such as a frequency with which replicas are generated and how long each replica 118 is kept at target site 112. In some embodiments, policy 114 defines metrics for use in snap set creation and replication process determinations.

As described herein, in example embodiments, data replication may be synchronous data replication with snap sets created in dynamic intervals during operation of storage system 100. The timing of synchronous replication cycles and the retention of the replicas 118 may be managed by replica manager 116 of target site 112.

In addition to managing replicas 118 according to a policy 114 (e.g., a replication and/or retention policy), the replica manager 116 may also include a cycle counter 117 to track generations of snap sets over time.

It will be understood that the roles of the source site 102 and the target site 112 may be reversed in instances, e.g., in which an event occurring on the source site 102 causes the target site 112 to intercept I/Os and take on the role of snap set creation and replication to the source site. This role reversal is referred to as a failover event. In this manner, the processes described herein apply equally to the target site. In this instance, the source site 102 becomes the new target site, and the target site 112 becomes the new source site, as shown in FIG. 1.

Figure 2:
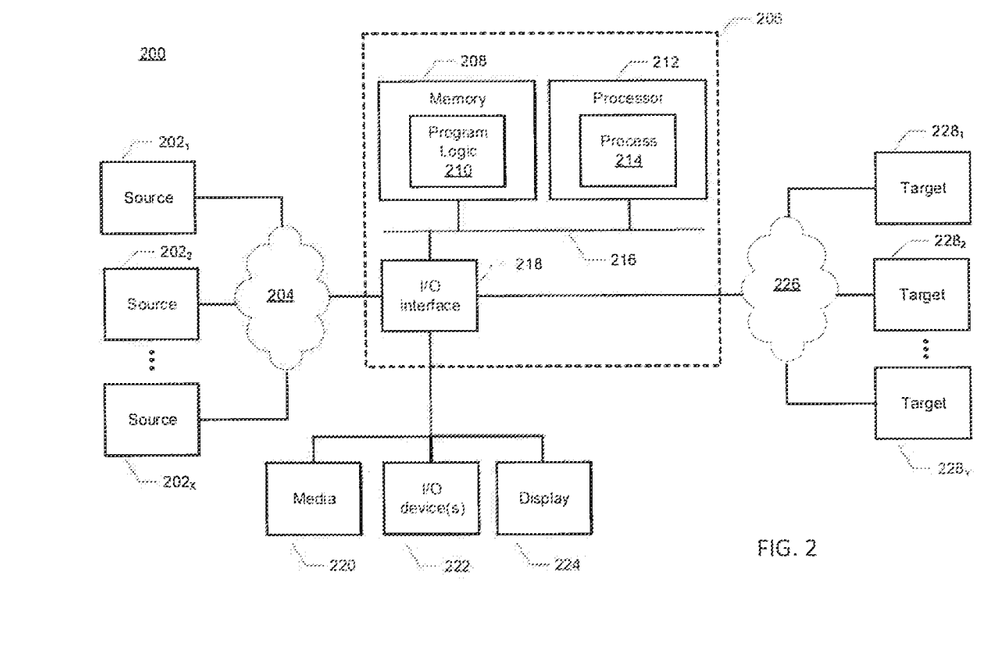
FIG. 2 is a block diagram of another storage system to perform automatic recovery of a sync replication session in response to an error condition in accordance with an illustrative embodiment.

Referring now to FIG. 2, in an illustrative embodiment, an apparatus 206 may form part of system 200 and include a memory 208 storing program logic 210, a processor 212 for executing a process 214, and a communications I/O interface 218, connected via a bus 216 to allow communication between memory 208, processor 212 and devices external to apparatus 206. Apparatus 206 may correspond to elements of the source site 102 of FIG. 1. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via a network 204. Source devices $202_1$-$202_X$ may correspond to elements of the source site 102 in FIG. 1. In some embodiments, communications I/O interface 218 may couple apparatus 206 to one or more target devices $228_1$-$228_Y$ via networks 226. Target devices $228_1$-$228_Y$ may correspond to elements of the target site 112 in FIG. 1. In some embodiments, networks 226 of FIG. 2 may include a communication fabric between volumes of targets 228. For example, in some embodiments, networks 226 may include an InfiniBand (IB) network or a Fibre Channel (FC) network. Networks 226 may also include a long-distance communication network of a storage area network (SAN), e.g., over an Ethernet or Internet (e.g., TCP/IP) link that may employ, for example, the iSCSI protocol.

Figure 3:
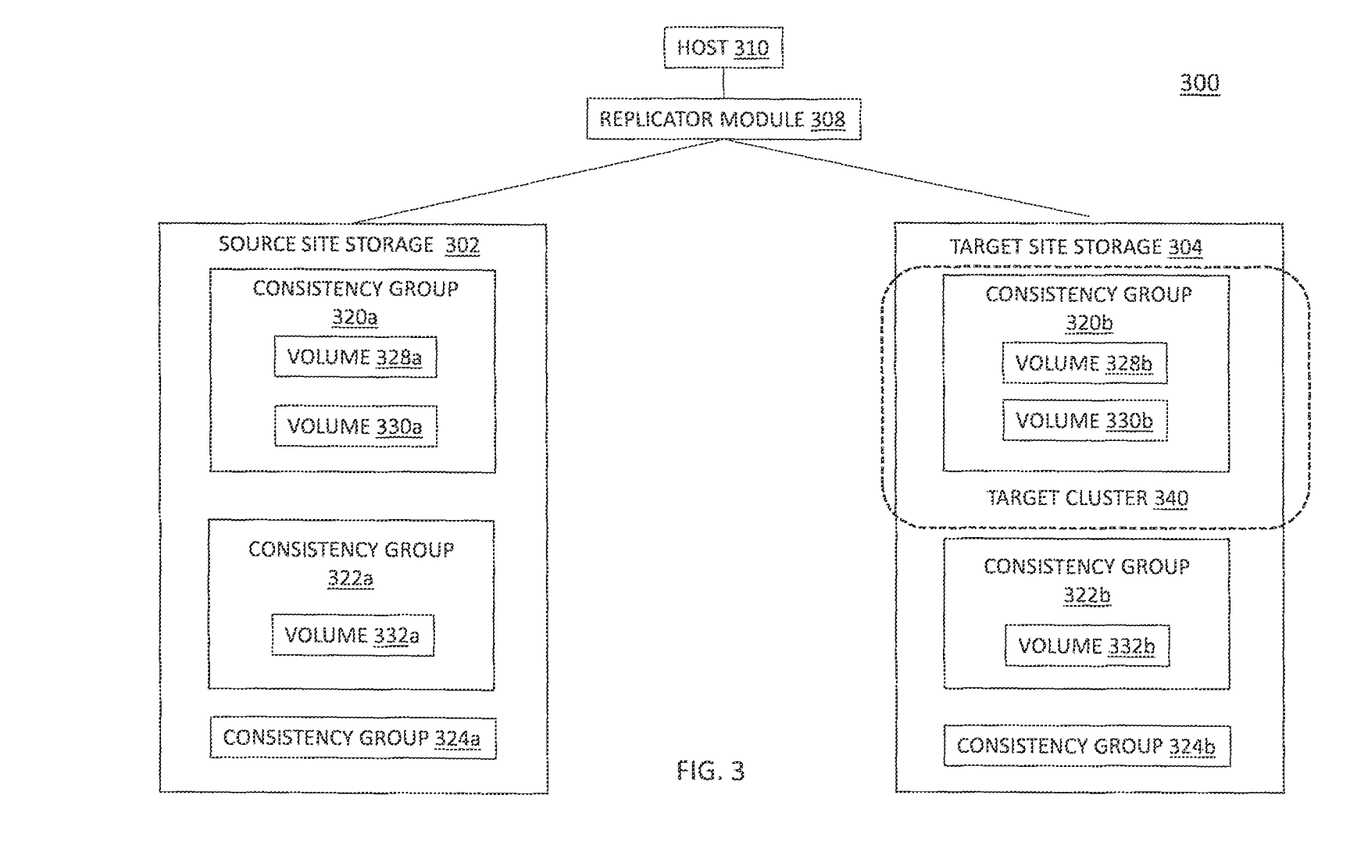
FIG. 3 is a block diagram of another storage system to provide automatic recovery of a sync replication session in response to an error condition in accordance with an illustrative embodiment.

FIG. 3 is a simplified block diagram of an exemplary replication system 300, in accordance with one illustrative embodiment, which may be implemented using the system 100 of FIG. 1 and/or the apparatus 206 of FIG. 2. The system 300 includes a host computer 310 (also referred to herein as an "initiator"), a replicator module 308 executable by the host computer 310, a source storage module 302 (e.g., a storage array) on a source side and a target storage module 304 (e.g., a storage array), on a target side, which all advantageously are in operable communication over a network (not shown). The host computer 310 may include an application (not shown) that writes to the source storage 302. The replicator module 308 ensures that all the writes made to the source storage 302 are also eventually made to the target storage devices 304. The replicator module 308 may reside outside the storage arrays 302 and 304, or it may be inside one of them, or it may be in an independent system, or it may be inside the host 310.

The source storage 302 includes consistency groups (CGs) (e.g., a consistency group 320a, a consistency group 322a and a consistency group 324a) and the target storage device 304 also includes a consistency group 320b, a consistency group 322b, and a consistency group 324b. The consistency group 320a includes volumes (e.g., a volume 328a and a volume 330a) and the consistency group 320b includes volumes (e.g., volumes 328b and 330b). The consistency group 322a includes a volume 332a and the consistency group 322b volume 332b. In certain embodiments, the storage volumes 328b, 330b, 332b, are replicas of the respective consistency groups 320a, 322a on the source storage side. In certain embodiments, the target storage module 304 can include target cluster 340.

The host 310 also can, for example, be similar to the storage systems 100 of FIG. 1 and apparatus of FIG. 2). The source storage 302 can be located at a production site and the target storage system 304 can be located at a replication site. Although the system 300 shows a plurality of consistency groups 320, 322, 324 at the source side, at least some systems 300 can have a single consistency group (e.g., consistency group 320a) that is replicated into multiple target clusters in addition to the target cluster 340. In certain embodiments, one or more of the source side consistency groups are replicated synchronously to the target storage device.

In certain embodiments, the consistency group 320a and the consistency group 320b may form first and second replication pairs, where the consistency group 320a is replicated synchronously to the consistency group 320b. The consistency group 322a and the consistency group 322b also form a replication pair wherein the consistency group 322a is replicated synchronously to the consistency group 522b.

In certain embodiments, the volumes for consistency group 320a and the consistency group 320b form volume pairs, so that each volume in consistency group 320a corresponds to exactly one volume in consistency group 320b. That is, the volume 328a is paired with the volume 328b and the volume 330a is paired with the volume 330b. In particular, in certain embodiments, the volume 328a is replicated at the volume 328b and the volume 330a is replicated at the volume 330b. In one example, a replication pair includes information on the volume pairs and the replication, and fully describes a replication instance between a source storage and a target storage.

Referring still to FIG. 3, in one example, one or more of the storage volumes on the source side and the target side are each on a respective disk. For example, in one embodiment, the storage volumes 328a and 330a in consistency group 320a is on a first respective flash memory device and is configured for replication to replicate to the target cluster 340, which is on a flash memory device.

To provide predictable high performance to applications, storage arrays such as XtremIO set a hard IO timeout value (for example 30 seconds based on default SCSI IO timeout on many host systems). IOs return to the host, as either "success," "busy," or "error," within the hard timeout value. This can present significant challenges to sync replication operations, as additional time is needed for each IO to copy the data from the IO request, to send the data copy to the target cluster, and to recover if there is link or system component failure at either the source or target systems.

When enabling sync replication, certain latency increases are expected and are typically handled by capacity planning. However, the probability of IO errors could still increase due to additional transfer hops and various components involved. In some cases, it may be desirable to abort sync replication while allowing the host IO to complete. In other cases, such as a failure during journal recovery, it may be necessary to abort/stop sync replication to allow for a complete recovery (otherwise, the system may face a rolling panic of software).

The embodiments described herein allow a system to preserve data consistency in the event of sync replication IO failures, and to recover automatically without manual intervention. This capability can greatly improve the feature resilience and alleviate an administrator's burden in managing sync replication. While the embodiments described herein may be implemented for XtremIO, it will be understood that the techniques presented herein may be applicable for other storage systems, e.g., any content addressable storage system.

The embodiments described herein provide a state machine that monitors the system health during a replication session and transitions between various states of the machine to coordinate an automated recovery effort. Traditionally, IO errors and resulting recovery efforts require user/admin manual intervention to trigger async-to-sync recovery.

Much emphasis has been afforded for ways to minimize CG trip events at significant complexity. With the automatic recovery design process of the embodiments described herein, the manual recovery after such failure events can be eliminated, thereby greatly simplifying the error handling of sync replication data transfer, as well as user management of sync replication.

Note that to ensure recoverability of the sync replication and allow replication IO to roll forward upon recovery, the data path is designed to persist the data on the source first and use atomic transaction journal reads (JRs) to protect inflight sync replication IOs. In particular, during a write operation, the process creates an atomic JR entry, sets A2H metadata, swaps the atomic JR with sync replication JR entries, and performs sync replication data transfer. The process then clears the sync replication JR, and during Xenv restart IO recovery, replays the atomic JR (performing sync replication data transfer if it is a sync replication source), and replays sync replication JR to resend sync replication data.

In a distributed system such as XtremIO, multiple data modules may participate in servicing IOs. There are various types of IO errors that can occur during a sync replication cycle. Some errors are recoverable and others are non-recoverable. For instance, a recoverable error may involve a link that is down but is expected to return online. For a recoverable error, an incomplete IO may be recovered and completed at the target site.

An unrecoverable error may occur (e.g., the I/O request is running out of time to retry) at the source, in which the corresponding data and/or metadata to be updated have not been persisted at the source. In this situation, the IO error may be returned to the host initiator.

Alternatively, an unrecoverable error/panic may occur during sync replication data transfer, in which the data has been already persisted at the source. In this situation, the source data path triggers a CG trip to preserve volume consistency on the target then returns IO success back to the initiator upon CG trip complete. Note that the source and target are now out of sync, and the source stops sending data to the target for future IO requests until successful recovery.

Figure 4:
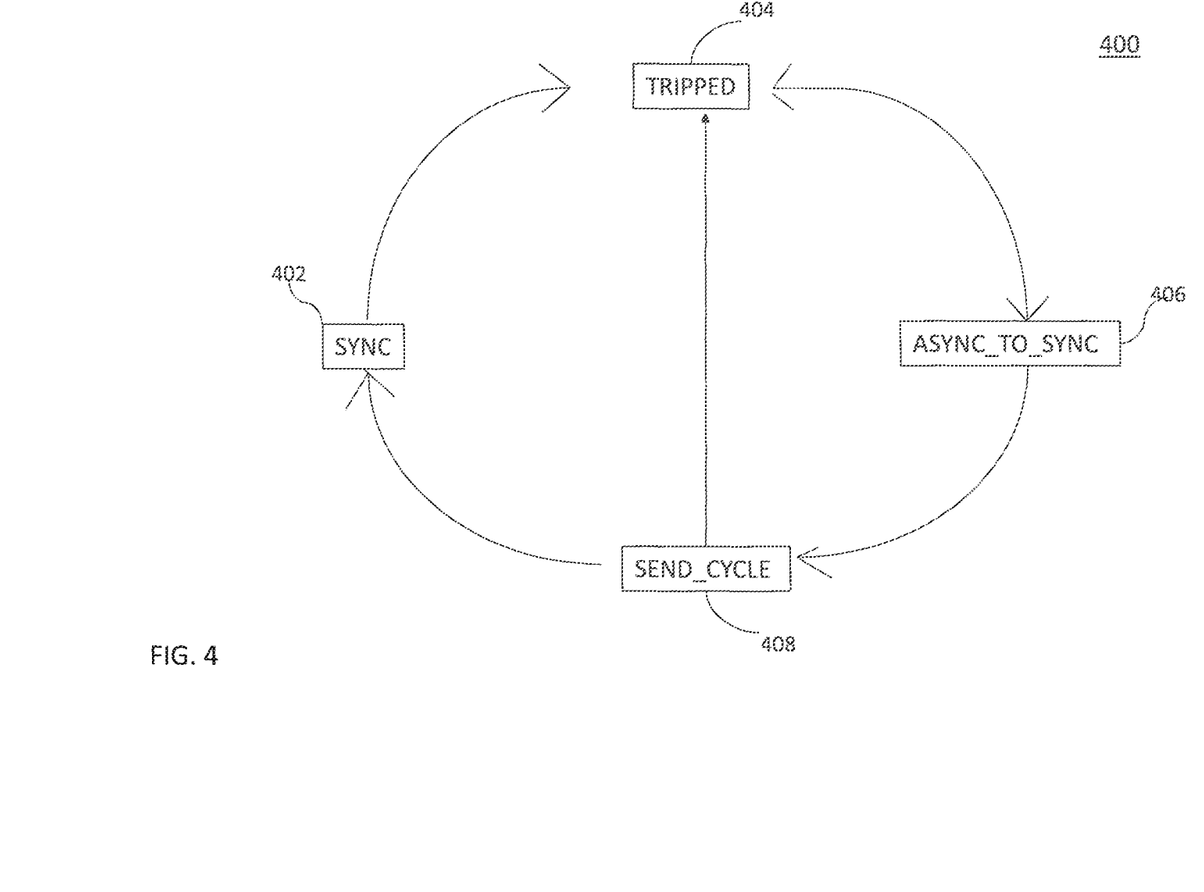
FIG. 4 is a state diagram for use in performing automatic recovery of a sync replication session in response to an error condition in accordance with an illustrative embodiment.

In XtremIO a management module operates in conjunction with the data modules during sync replication and may be tasked with the automated recovery orchestration. In an embodiment, a state machine runs for each sync replication session within the management module. By way of non-limiting examples, these modules may be implemented, e.g., via the storage application 116 of FIG. 1, the apparatus 206 of FIG. 2, and/or the computer 600 of FIG. 6. Without external user commands/operations, and as shown in FIG. 4, a state machine 400 runs through the following states during sync replication:

Sync state 402—In sync state 402, the source and target sites are operating in sync. The state machine 400 periodically creates recovery snap set pairs (described below) on both the source and the target sites and monitors for CG trip events. Upon receiving a CG trip request notification, the state machine 400 performs a CG trip, which causes the sync replication IO session to halt on all data modules. The state machine 400 then moves from the sync state 402 to the tripped state 404.

Tripped state 404—In the tripped state 404, the source and target sites are determined to be out of sync. The state machine 400 monitors the system health conditions for sync replication. Conditions subject to monitoring include, e.g., link status, local system software and hardware states, and remote system software and hardware states. If the system is determined to be healthy, (e.g., the link is operable), the cause for the CG trip no longer exists, and there are enough resources to conduct sync replication remote data transfer, the state machine 400 is moved from the tripped state 404 to async_to_sync state 406, which causes the system to begin automatic recovery operations.

Async_to_Sync state 406—Async_to_Sync state causes the state machine 400 to locate the latest (most recent) recovery snap set pair to use as a base to start an async to sync cycle which enables sync replication data transfer. Following the data transfer, the state machine 400 transitions to a send_cycle state 408. A recovery snap set includes a snap set that contains a subset of data content that is also stored at the target site and has a time of creation that is equal to or greater than a timeout value for serving input/outputs (IOs) to the target site. A difference between volumes of the source site and the recovery snap set is sent to the target site, which is configured to enable in sync status between the source site and the target site. Recovery snap sets are further described in commonly assigned application, "Method to Support Synchronous Replication Failover," application Ser. No. 16/042,363, filed on Jul. 23, 2018, the entire contents of which are incorporated by reference herein in its entirety.

In particular, async-to-sync recovery processes utilize recovery snap set pairs that are created periodically during sync replication active state. In an embodiment, the system creates snapshot Sn against a source CG based on a last cycle number n. The system waits until all inflight IOs committed to the target at the time of Sn creation (e.g., wait until the maximum IO timeout value has been reached or until all inflight sync replication IOs at the time of snap set creation have cleared). The system creates a snapshot against a target CG with the same last cycle number Sn' and increments the session last cycle number to n+1. As long as Sn<=Sn', incremental fast recovery for sync replication can be initiated (in order to solve out of order sync/async replication write IO race conditions). To prepare for recovery, a new active snapshot is created based on Sn' on the target site. Sync replication IO is initiated from the source CG to the target active snapshot. Async-to-sync transition cycle is performed to transfer the delta between Sn and source CG to the target active SS. The session reaches sync active state once the transition cycle completes.

Send_Cycle state 408—In this state, the state machine 400 instructs all data modules to perform async-to-sync transition cycle transfer and sync replication concurrently and monitors the progress of the transition cycle. The async-to-sync transition cycle transfer and sync replication is performed to avoid the need to suspend application IO when switching from async-to-syn replication. Upon cycle complete, the state machine 400 returns to the sync state 402.

Note that during the recovery states, async_to_sync and send_cycle, IOs may still fail, and the state machine 400 may then fall back to the tripped state upon such failure. In this case, the system retries automatically at a later time. On the other hand, a user may notice the source and target are out of sync when the session is not in sync state and have the option to terminate sync replication or simply allow the system to recover automatically.

Figure 5:
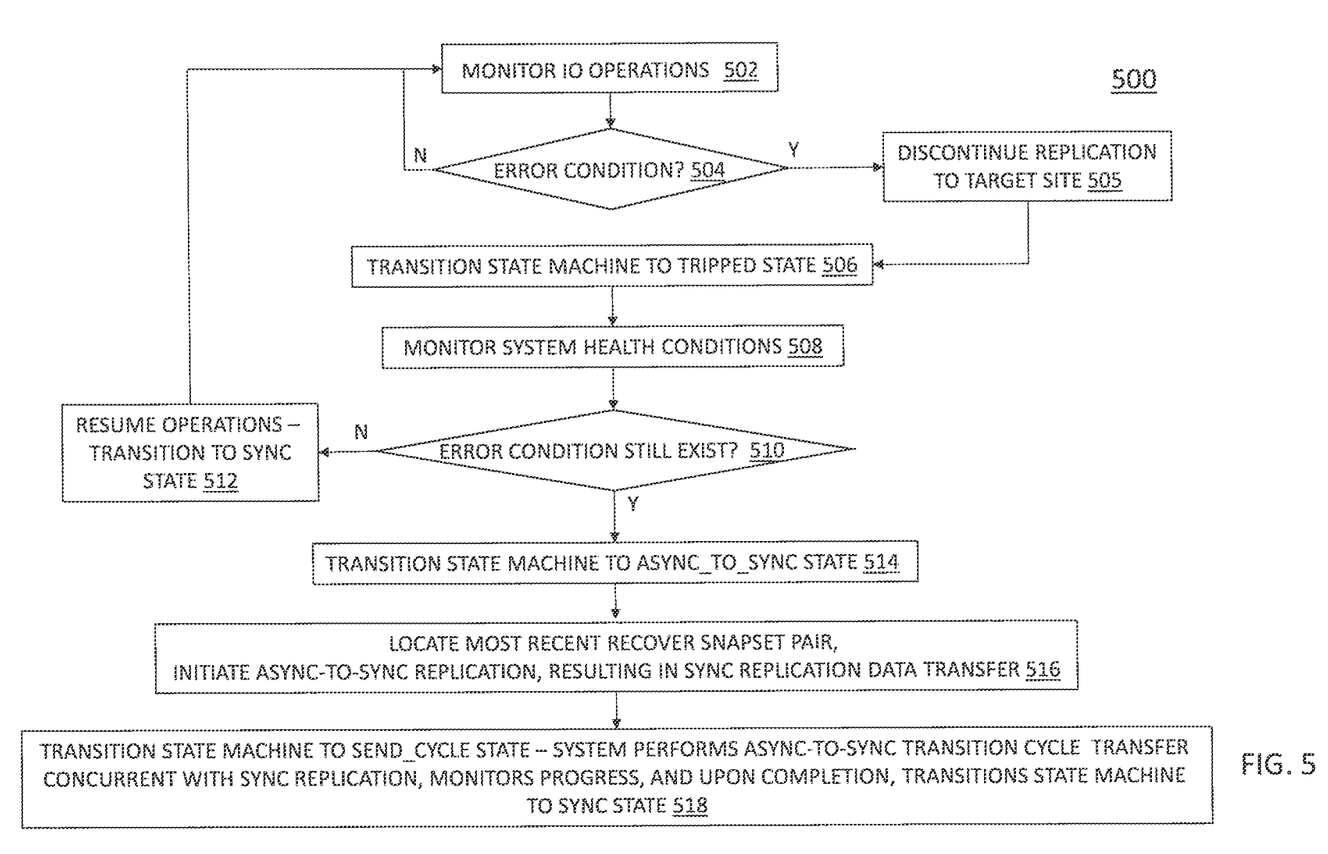
FIG. 5 is a flow diagram of a process for automatic recovery of a sync replication session in response to an error condition in accordance with an illustrative embodiment.

Turning now to FIG. 5, a flow diagram of a process 500 for performing automatic recovery of a synchronous (sync) replication session in response to an error condition will now be described in an embodiment. The process 500 may be implemented during an active synchronous replication session between the source site and the target site. The process 500 assumes that the system is operating in sync, meaning that both the source and target sites contain the same data.

At block 502, I/O operations occurring during the replication session are monitored. In block 504, it is determined whether an error condition has occurred as a result of the monitoring. If not, the process returns to block 502.

Otherwise, if an error condition has been detected, the process 500 discontinues IO replication to the target site in block 505, and the state machine transitions from the sync state to a tripped state in block 506. System health conditions are monitored in block 508 and it is determined whether the health of the system indicates the error condition no longer exists in block 510. If the error condition no longer exists, the system state is returned to sync state and normal sync replication operations continue in block 512.

If the error condition continues to exist, the state machine is transitioned to async_to_sync state in block 514, which causes the system to locate a most recent recovery snap set pair, initiate async-to-sync replication using the snap set pair, which results in a sync replication data transfer in block 516. In block 518, upon completion of the data transfer, the state machine transitions to send_cycle state in which the system performs async-to-sync transition cycle transfer concurrently with sync replication, monitors the progress of the transition cycle transfer and sync replication, and upon completion of the sync replication data transfer, transitions the state machine to the sync state.

Figure 6:
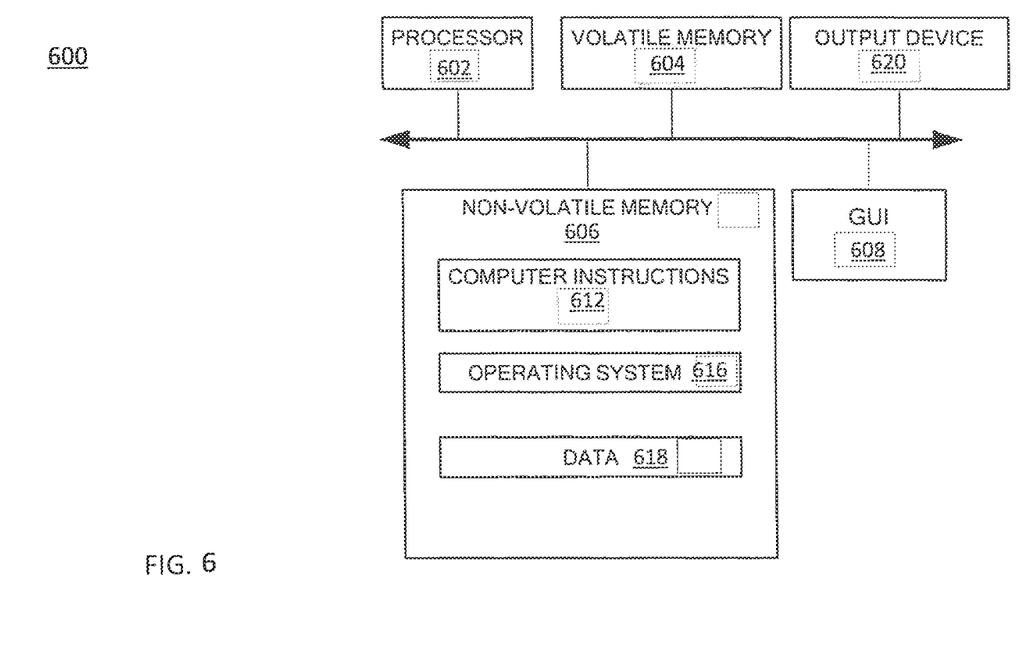
FIG. 6 is a block diagram of a hardware device that may perform at least a portion of the processes shown in FIG. 5.

In some embodiments, the source site 102 and/or target site 112 may be implemented as one or more computers, such as a computer 600 as shown in FIG. 6. Likewise, one or more devices and/or systems of FIGS. 2 and 3 may be implemented by a computer, such as computer 600. Computer 600 may include processor 602, volatile memory 604 (e.g., RAM), non-volatile memory 606 (e.g., a hard disk drive, solid state drive such as a flash drive, a hybrid magnetic and solid state drive, etc.), graphical user interface (GUI) 608 (e.g., a mouse, a keyboard, a display, and so forth) and input/output (I/O) device 620. Non-volatile memory 606 stores computer instructions 612, an operating system 616 and data 618 such that, for example, the computer instructions 612 are executed by the processor 602 out of volatile memory 604 to perform at least a portion of the process 300 shown in FIG. 5. Program code may be applied to data entered using an input device of GUI 608 or received from I/O device 620.

Process 500 shown in FIG. 5 is not limited to use with the hardware and software of FIG. 6 and may find applicability in any computing or processing environment and with any type of machine or set of machines that is capable of running a computer program. Process 500 shown in FIG. 5 may be implemented in hardware, software, or a combination of the two.

The processes described herein are not limited to the specific embodiments described. For example, process 500 is not limited to the specific processing order shown in FIG. 5. Rather, one or more blocks of process 500 may be re-ordered, combined or removed, performed in parallel or in serial, as necessary, to achieve the results set forth herein.

Processor 602 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general-purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow chart of FIG. 5, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 7:
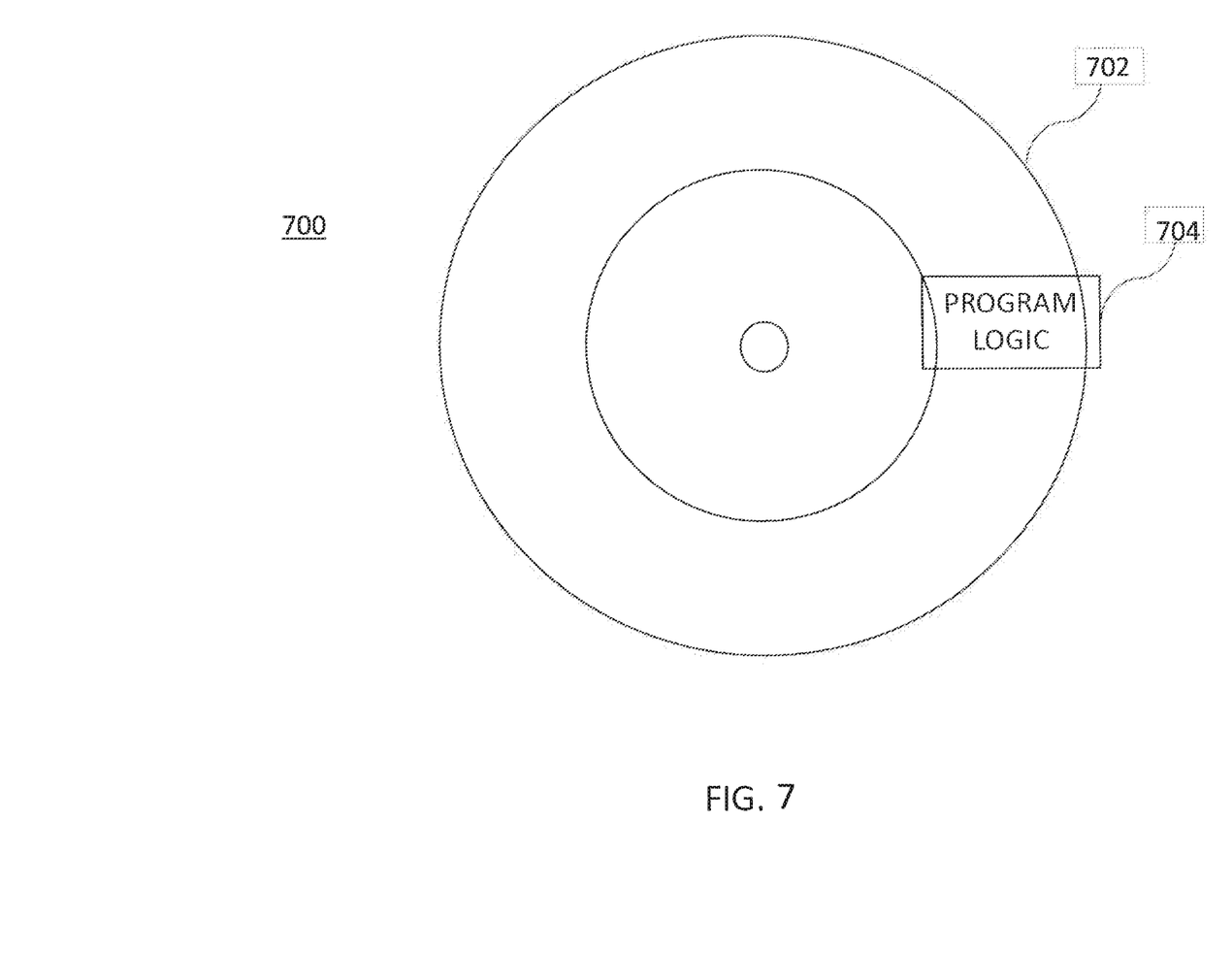
FIG. 7 is a simplified block diagram of an apparatus that may be used to implement at least a portion of the systems of FIGS. 1-3 and at least a portion of the process of FIG. 5.

For example, when the program code is loaded into and executed by a machine, such as the computer of FIG. 6, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 7 shows Program Logic 704 embodied on a computer-readable medium 702 as shown, and wherein the Logic is encoded in computer-executable code configured for carrying out the reservation service process of this invention and thereby forming a Computer Program Product 700. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method to perform automatic recovery of a synchronous (sync) replication session in response to an error condition for a storage system including a source site and a target site, the method comprising:

during an active sync replication session between the source site and the target site in which a state machine at the storage system indicates the system is operating in a sync state, monitoring input/output (IO) operations, wherein the active sync replication session includes data replication from the source site to the target site, and wherein the sync state indicates the source site and the target site are operating in sync; and upon determining, during the active sync replication session, an occurrence of the error condition in which data subject for updating at the target site has been persisted at the source site and not yet persisted at the target site:

discontinuing IO replication to the target site; and transitioning the state machine from the sync state to a tripped state; and upon determining, during the tripped state, resources exist to conduct sync replication remote data transfer operations, transition the state machine to an async_to_sync state, the async_to_sync state causing the storage system to initiate a recovery operation, the recovery operation configured to return the source site and the target site to the sync state.

2. The method of claim 1, wherein during the async_to_sync state, the recovery operation comprises:

locating a most recent recovery snap set pair;

initiating an async-to-sync replication cycle using the recovery snap set pair, the async-to-sync replication cycle resulting in sync replication data transfer; and upon completion of the sync replication data transfer, transitioning the state machine to a send_cycle state.

3. The method of claim 2, further comprising:

upon determining an occurrence of an IO failure during the async-to-sync replication cycle, transitioning the state machine back to the tripped state.

4. The method of claim 2, wherein during the send_cycle state, the method further comprises:

performing async-to-sync transition cycle transfer concurrently with sync replication;

monitoring progress of the async-to-sync transition cycle transfer and sync replication; and upon completion of the async-to-sync transition cycle transfer and the sync replication, transitioning the state machine back to the sync state.

5. The method of claim 4, wherein upon determining an occurrence of an IO failure during the async-to-sync transition cycle transfer or the sync replication, transitioning the state machine back to the tripped state.

6. The method of claim 1, wherein the error condition comprises an IO error condition in which a set timeout value is 30 seconds and the data subject to updating at the target site has not been persisted prior to expiration of the timeout value.

7. The method of claim 1, wherein a plurality of state machines is provided in the storage system, and each of the state machines corresponds to one of a plurality of synchronous replication sessions.

8. A system for performing automatic recovery of a synchronous (sync) replication session in response to an error condition for a storage system including a source site and a target site, the system comprising:

a memory comprising computer-executable instructions; and a processor operable by a storage system, the processor executing the computer-executable instructions, the computer-executable instructions when executed by the processor cause the processor to perform operations comprising:

during an active sync replication session between the source site and the target site in which a state machine at the storage system indicates the system is operating in a sync state, monitoring input/output (IO) operations, wherein the active sync replication session includes data replication from the source site to the target site, and wherein the sync state indicates the source site and the target site are operating in sync; and upon determining, during the active sync replication session, an occurrence of the error condition in which data subject for updating at the target site has been persisted at the source site and not yet persisted at the target site:

discontinuing replication to the target site; and transitioning the state machine from the sync state to a tripped state; and upon determining, during tripped state, resources exist to conduct sync replication remote data transfer operations, transition the state machine to an async_to_sync state, the async_to_sync state causing the storage system to initiate a recovery operation, the recovery operation configured to return the source site and the target site to the sync state.

9. The system of claim 8, wherein during the async_to_sync state, the recovery operation comprises:

locating a most recent recovery snap set pair;

initiating an async-to-sync replication cycle using the recovery snap set pair, the async-to-sync replication cycle resulting in sync replication data transfer; and upon completion of the sync replication data transfer, transitioning the state machine to a send_cycle state.

10. The system of claim 9, wherein the operations further include:

upon determining an occurrence of an IO failure during the async-to-sync replication cycle, transitioning the state machine back to the tripped state.

11. The system of claim 9, wherein during the send_cycle state, the operations further comprise:

performing async-to-sync transition cycle transfer concurrently with sync replication;

monitoring progress of the async-to-sync transition cycle transfer and sync replication; and upon completion of the async-to-sync transition cycle transfer and the sync replication, transitioning the state machine back to the sync state.

12. The system of claim 11, wherein upon determining an occurrence of an IO failure during the async-to-sync transition cycle transfer or the sync replication, transitioning the state machine back to the tripped state.

13. The system of claim 8, wherein the error condition comprises an IO error condition in which a set timeout value is 30 seconds and the data subject to updating at the target site has not been persisted prior to expiration of the timeout value.

14. The system of claim 8, wherein storage system includes a plurality of state machines, and each of the state machines corresponds to one of a plurality of synchronous replication sessions.

15. A computer program product embodied on a non-transitory computer readable medium, the computer program product including instructions that, when executed by a computer, causes the computer to perform operations comprising:

during an active sync replication session between the source site and the target site in which a state machine at the storage system indicates the system is operating in a sync state, monitoring input/output (IO) operations, wherein the active sync replication session includes data replication from the source site to the target site, and wherein the sync state indicates the source site and the target site are operating in sync; and upon determining, during the active sync replication session, an occurrence of the error condition in which data subject for updating at the target site has been persisted at the source site and not yet persisted at the target site:
  discontinuing IO replication to the target site; and
  transitioning the state machine from the sync state to a tripped state; and
upon determining, during the tripped state, resources exist to conduct sync replication remote data transfer operations, transition the state machine to an async_to_sync state, the async_to_sync state causing the storage system to initiate a recovery operation, the recovery operation configured to return the source site and the target site to the sync state.

16. The computer program product of claim 15, wherein during the async_to_sync state, the recovery operation comprises:
  locating a most recent recovery snap set pair;
  initiating an async-to-sync replication cycle using the recovery snap set pair, the async-to-sync replication cycle resulting in sync replication data transfer; and
  upon completion of the sync replication data transfer, transitioning the state machine to a send_cycle state.

17. The computer program product of claim 16, wherein the operations further include:
  upon determining an occurrence of an IO failure during the async-to-sync replication cycle, transitioning the state machine back to the tripped state.

18. The computer program product of claim 16, wherein during the send_cycle state, the operations further comprise:
  performing async-to-sync transition cycle transfer concurrently with sync replication;
  monitoring progress of the async-to-sync transition cycle transfer and sync replication; and
  upon completion of the async-to-sync transition cycle transfer and the sync replication, transitioning the state machine back to the sync state.

19. The computer program product of claim 18, wherein upon determining an occurrence of an IO failure during the async-to-sync transition cycle transfer or the sync replication, transitioning the state machine back to the tripped state.

20. The computer program product of claim 15, wherein the error condition comprises an IO error condition in which a set timeout value is 30 seconds and the data subject to updating at the target site has not been persisted prior to expiration of the timeout value; and
  wherein a plurality of state machines is provided in the storage system, and each of the state machines corresponds to one of a plurality of synchronous replication sessions.

* * * * *